US010161444B2

(12) United States Patent
Lee (10) Patent No.: US 10,161,444 B2
(45) Date of Patent: Dec. 25, 2018

(54) AIR FOIL THRUST BEARING

(71) Applicant: HYUNDAI MOTOR COMPANY, Seoul (KR)

(72) Inventor: Chang Ha Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/484,903

(22) Filed: Apr. 11, 2017

(65) Prior Publication Data

US 2018/0156266 A1    Jun. 7, 2018

(30) Foreign Application Priority Data

Dec. 5, 2016 (KR) .................. 10-2016-0164178

(51) Int. Cl.
*F16C 17/04* (2006.01)
*F16C 35/02* (2006.01)

(52) U.S. Cl.
CPC ............ *F16C 17/042* (2013.01); *F16C 35/02* (2013.01); *F16C 2226/36* (2013.01)

(58) Field of Classification Search
CPC ..... F16C 17/042; F16C 35/02; F16C 2226/36
See application file for complete search history.

(56) References Cited

U.S. PATENT DOCUMENTS

| | | | | |
|---|---|---|---|---|
| 3,635,534 A * | 1/1972 | Barnett | ................. | F16C 17/024 384/106 |
| 4,213,657 A * | 7/1980 | Gray | ..................... | F16C 17/024 384/105 |
| 4,668,106 A * | 5/1987 | Gu | ......................... | F16C 17/042 267/161 |
| 4,682,900 A * | 7/1987 | Gu | ......................... | F16C 27/02 384/105 |
| 4,776,077 A * | 10/1988 | Gu | ........................ | F16C 17/042 216/100 |
| 4,871,267 A * | 10/1989 | Gu | ........................ | F16C 17/042 384/105 |
| 5,110,220 A * | 5/1992 | Gu | ........................ | F16C 17/042 384/103 |
| 5,248,205 A * | 9/1993 | Gu | ........................ | F16C 17/042 384/106 |
| 5,318,366 A * | 6/1994 | Nadjafi | .................. | F16C 27/02 384/105 |
| 5,498,082 A * | 3/1996 | Nadjafi | ................. | F16C 17/042 384/105 |
| 5,529,398 A * | 6/1996 | Bosley | .................. | F01D 25/168 384/105 |
| 5,540,505 A * | 7/1996 | Struziak | ................ | F16C 17/042 384/105 |
| 5,833,369 A * | 11/1998 | Heshmat | ............... | F16C 17/042 384/105 |
| 5,871,284 A * | 2/1999 | Nadjafi | ................. | F16C 17/042 384/105 |

(Continued)

*Primary Examiner* — Alan B Waits
(74) *Attorney, Agent, or Firm* — Lempia Summerfield Katz LLC (57) ABSTRACT

An air foil thrust bearing includes a base plate and a bump foil structure attached to the base plate. The bump foil structure has two or more bump foils and one or more first rings connecting the two or more bump foils. and the air foil thrust bearing includes a top foil structure attached to the base plate. The top foil structure has two or more top foils and one or more second rings connecting the two or more top foils.

9 Claims, 14 Drawing Sheets

(56) References Cited

U.S. PATENT DOCUMENTS

| | | | | |
|---|---|---|---|---|
| 5,938,341 | A * | 8/1999 | Eccles | F16C 27/08 |
| | | | | 384/105 |
| 6,158,892 | A * | 12/2000 | Stewart | F16C 17/042 |
| | | | | 384/105 |
| 6,224,263 | B1 * | 5/2001 | Saville | F16C 17/042 |
| | | | | 384/103 |
| 6,261,002 | B1 * | 7/2001 | Ermilov | F16C 17/024 |
| | | | | 384/105 |
| 6,354,741 | B1 * | 3/2002 | Saville | F16C 17/042 |
| | | | | 384/105 |
| 6,702,463 | B1 * | 3/2004 | Brockett | F16C 17/042 |
| | | | | 384/103 |
| 9,726,220 | B2 * | 8/2017 | Kim | F16C 17/042 |
| 2004/0066991 | A1 * | 4/2004 | Agrawal | F01D 25/168 |
| | | | | 384/105 |
| 2004/0096130 | A1 * | 5/2004 | Saville | F16C 17/042 |
| | | | | 384/106 |
| 2004/0207158 | A1 * | 10/2004 | Agrawal | F16C 17/042 |
| | | | | 277/364 |
| 2005/0147335 | A1 * | 7/2005 | Agrawal | F01D 25/168 |
| | | | | 384/105 |
| 2005/0210875 | A1 * | 9/2005 | Larue | F16C 17/024 |
| | | | | 60/602 |
| 2005/0271311 | A1 * | 12/2005 | Saville | F16C 17/042 |
| | | | | 384/106 |
| 2009/0274401 | A1 * | 11/2009 | Adams | F16C 17/024 |
| | | | | 384/103 |
| 2015/0030270 | A1 * | 1/2015 | Heshmat | F16C 17/042 |
| | | | | 384/106 |
| 2016/0091016 | A1 * | 3/2016 | Struziak | F16C 17/042 |
| | | | | 384/105 |
| 2017/0191522 | A1 * | 7/2017 | Kim | F16C 17/042 |

\* cited by examiner

AIR FOIL THRUST BEARING

CROSS-REFERENCE TO RELATED APPLICATION

This application is based on and claims the benefit of priority to Korean Patent Application No. 10-2016-0164178, filed on Dec. 5, 2016, in the Korean Intellectual Property Office, the disclosure of which is incorporated herein in its entirety by reference.

TECHNICAL FIELD

The present disclosure relates to an air foil thrust bearing, and more particularly to an air foil thrust bearing that improves performance.

BACKGROUND

An air foil thrust bearing does not support a thrust of a rotary body by using an oil film like a ball bearing or a roller bearing. An air foil thrust bearing supports a thrust of a rotary body by supplying high-pressure air between an air foil and the rotary body and forming an air film.

The air foil thrust bearing is mainly used for a high-speed rotary body corresponding to 100,000 RPM or more, such as a compressor or a blower. However, manufacturing costs thereof are high and quality stability deteriorates due to a complex manufacturing process thereof.

Figure 1:
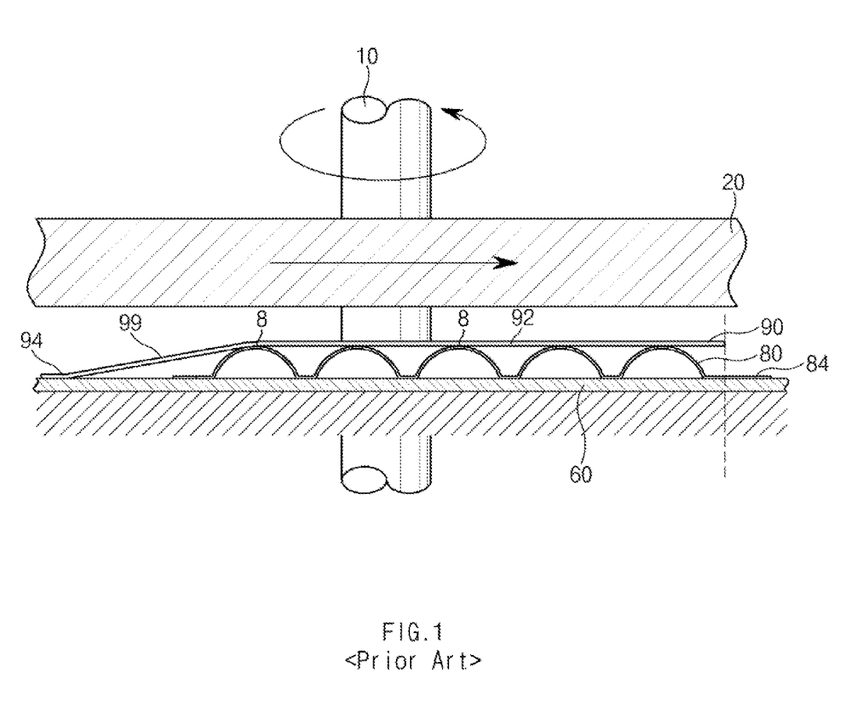
FIG. 1 is a plan view illustrating an air foil thrust bearing according to the related art.

As illustrated in FIG. 1, in an air foil thrust bearing, bump foils 80 are disposed on an upper surface of a base plate 60 and a top foil 90 is disposed on upper surfaces of the bump foils 80.

The top foil 90 may have an inclined portion 99 and a flat portion 92. The number of the bump foils 80 may be plural.

If a bearing disk 20 is rotated as a rotor 10 rotates, a pressure is formed between the top foil 90 and the bearing disk 20 to support a load as air is introduced along the inclined portion 99 of the top foil 90.

An edge portion 94 of the top foil 90 may be attached to a base plate 60 through welding. Edge portions 84 of the bump foils 80 may be attached to the base plate 60 through welding.

In the conventional air foil thrust bearing, after the bump foils 80 are attached to the base plate 60 through welding, the top foil 90 is attached to the base plate 60 through welding.

In this way, individual jigs are used to weld the bump foils 80 and the top foil 90. However, because the bump foils 80 and the top foil 90 are formed of very small and thin sheet metals, the locations of the bump foils 80 and the top foil 90 are distorted so that an assembly process thereof is very troublesome and defects frequently occur.

Further, when the bump foils 80 and the top foil 90 are welded at inaccurate locations, the performance of the air foil thrust bearing deteriorates. Also, the bump foils or the top foil may separate when a welding defect occurs so that the rotor 10 may be damaged.

SUMMARY

The present disclosure has been made to solve the above-mentioned problems occurring in the prior art while advantages achieved by the prior art are maintained intact.

An embodiment of the present disclosure provides an air foil thrust bearing that improves performance through the stability of the manufacturing quality thereof and through reinforcement of the strength thereof. The disclosed air foil thrust bearing also simplifies a manufacturing process thereof and reduces manufacturing costs.

The technical problems to be solved by the present disclosure are not limited to the aforementioned problems, and any other technical problems not mentioned herein will be clearly understood from the following description by those having ordinary skill in the art to which the present disclosure pertains.

According to an aspect of the present disclosure, an air foil thrust bearing may include a base plate and a bump foil structure attached to the base plate. The bump foil structure may have two or more bump foils and one or more first rings connecting the two or more bump foils. The air foil thrust bearing may also have a top foil structure attached to the base plate. The top foil structure may have two or more top foils and one or more second rings connecting the two or more top foils.

The bump foil structure may have two or more connectors, each of which is formed on one side of the corresponding bump foil to be flat.

The two or more bump foils may be individually connected to the first ring through the two or more connectors.

The one or more first rings may be disposed at inner peripheries or outer peripheries of the bump foils.

The one or more first rings may include two first rings individually disposed at inner peripheries or outer peripheries of the bump foils.

The bump foil structure may have one or more first positioning recesses or one or more first positioning protrusions.

The top foil structure may have two or more connectors, each of which is formed on one side of the corresponding top foil to be flat.

The two or more top foils may be individually connected to the second ring through the two or more connectors.

The one or more second rings may be disposed at inner peripheries or outer peripheries of the top foils.

The one or more second rings may include two second rings disposed at inner peripheries or outer peripheries of the top foils, respectively.

The second ring may have one or more second positioning recesses or one or more second positioning protrusions.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. For reference, the sizes of the components and the thickness of the lines of the drawings may be rather exaggerated for convenience of understanding. Further, the terms used in the description of the present disclosure may be different according to the users, the intentions of the operators, or the customs in consideration of the functions in the present disclosure. Therefore, definitions of the terms should be made according to the overall disclosure set forth herein.

Referring to FIGS. 2-6, an air foil thrust bearing 30 according to an embodiment of the present disclosure may include a bump foil structure 40 and a top foil structure 50 attached to an upper surface of a base plate 31.

The upper surface of the base plate 31 is flat. The bump foil structure 40 and the top foil structure 50 may be attached to the flat upper surface of the base plate 31 through welding.

Figure 2:
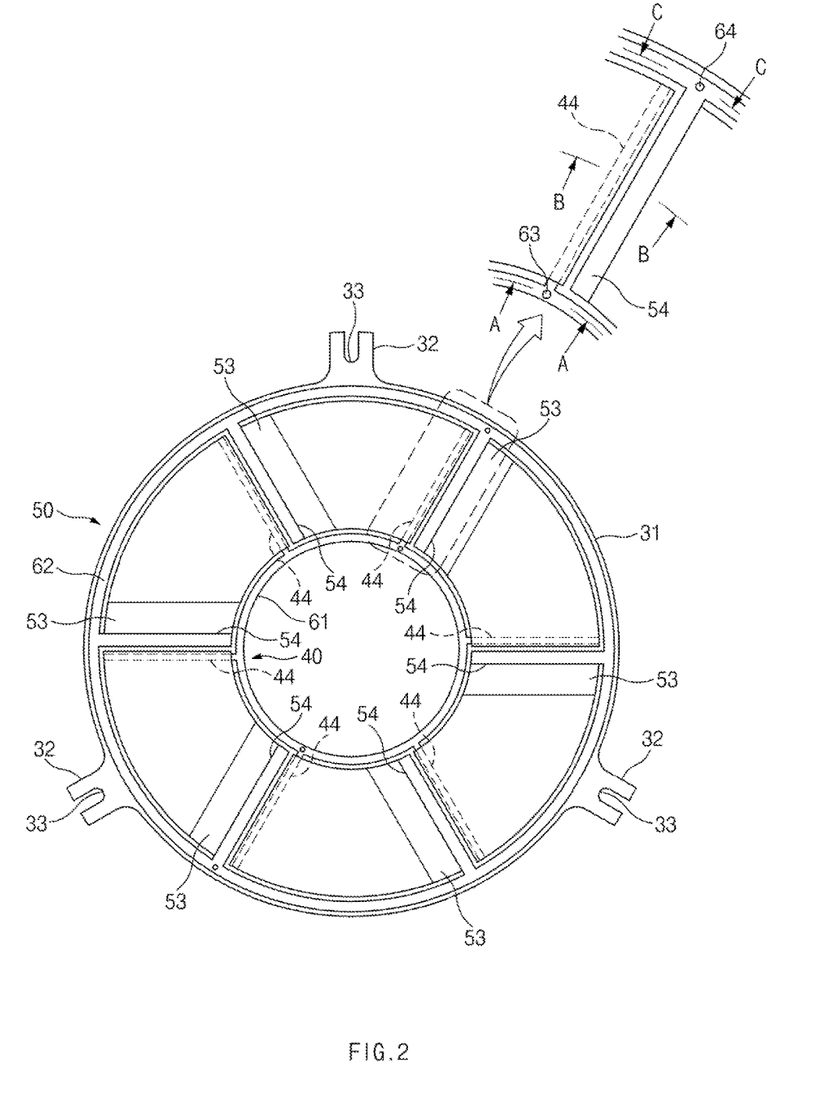
FIG. 2 is a plan view illustrating an air foil thrust bearing according to an embodiment of the present disclosure.

One or more mounting lugs 32 may be formed at an outer periphery of the base plate 31. Each of the mounting lugs 32 may have a mounting recess 33, to which a coupling member may be coupled. Through the mounting lugs 32, the base plate 31 may be firmly mounted on a turbo machine or the like. According to an embodiment, a plurality of mounting lugs 32 may be formed circumferentially along the outer periphery of the base plate 31 to be spaced apart from each other.

As illustrated in FIG. 2, the bump foil structure 40 may include two or more bump foils 41. One or more first rings 61 may connect the two or more bump foils 41.

Figure 3:
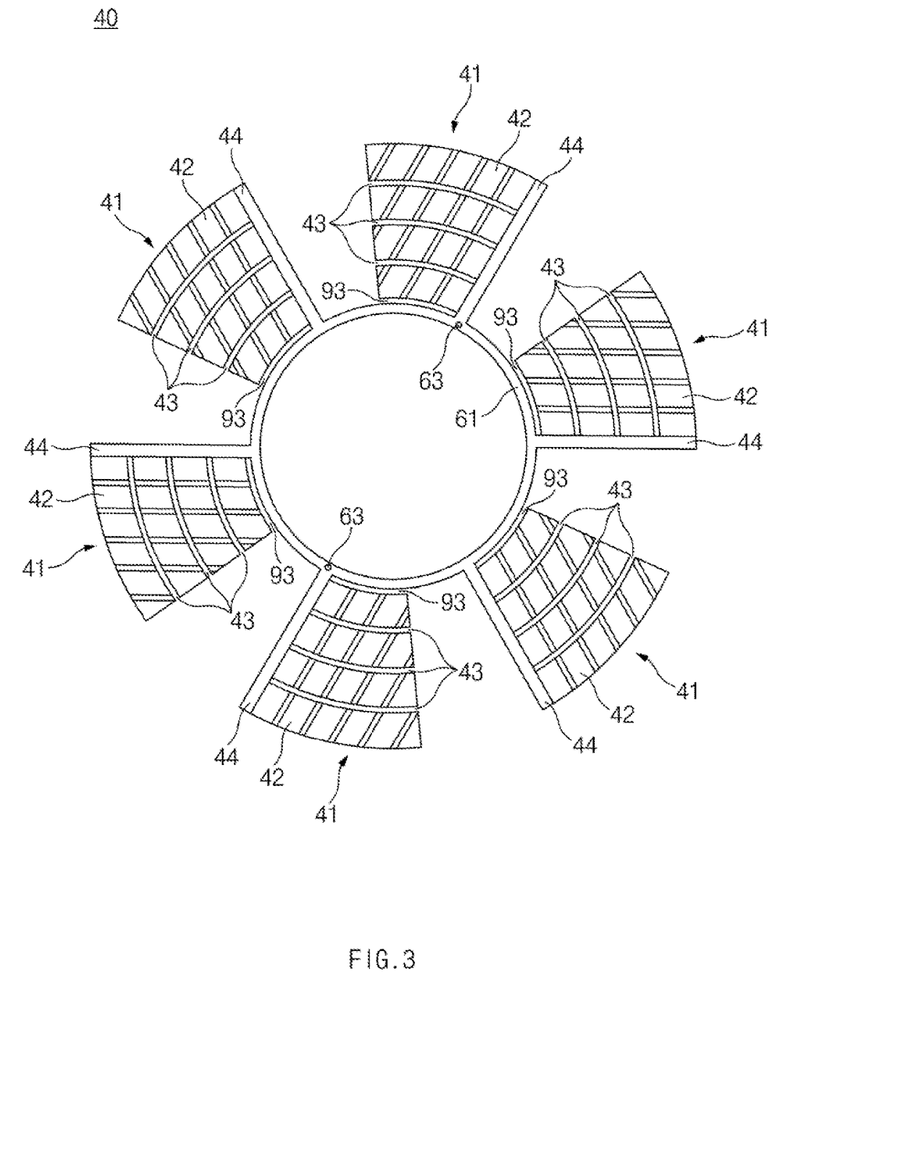
FIG. 3 is a plan view illustrating a bump foil structure of the air foil thrust bearing according to the embodiment of FIG. 2.

The two or more bump foils 41 may be circumferentially spaced apart from each other. FIG. 3 illustrates six bump foils 41 circumferentially spaced apart from each other.

Each of the bump foils 41 may have a sector shape, and may have a plurality of bumps 42. The plurality of bumps 42 may be formed at a specific interval. One or more slots 43 may cross the plurality of bumps 42.

The bump foil structure 40 may have two or more first connectors 44, each of which is formed on one side of the corresponding bump foil 41 to be flat. At least one of the connectors 44 of the bump foil 41 may be attached to the base plate 31 through welding.

The two or more bump foils 41 may be connected to the first ring 61 through the first connectors 44. Accordingly, the plurality of bump foils 51 may be connected to each other along a circumferential direction of the first ring 61 as a single body. The two or more first connectors 44 may be disposed radially with respect to the first ring 61.

The first ring 61 may be disposed at inner or outer peripheries of the two or more bump foils 41 to connect the two or more bump foils 41 circumferentially.

According to an example, as illustrated in FIG. 3, the first ring 61 may be disposed at inner peripheries of the bump foils 41. Accordingly, the inner peripheries of the bump foils 41 may be connected to the first ring 51 through the first connectors 44 as a single body. Here, an outer periphery of the first ring 61 and inner peripheries of the bump foils 41 may be spaced apart from each other through radial apertures 93.

According to another example, the first ring 61 may be disposed at outer peripheries of the bump foils 41. Accordingly, the outer peripheries of the bump foils 41 may be connected to the first ring 61 through the first connectors 44 as a single body.

In this way, according to this embodiment of the present disclosure, as the two or more bump foils 41 are integrated through the first ring 61, strength may be reinforced and only one first connector 44 may be attached to the base plate 31 through welding. Accordingly, the number of welding processes may be remarkably reduced as compared with the related art so that the assembly process may become simpler.

According to this embodiment of the present disclosure, the bump foil structure 40 may have one or more positioning recesses or one or more positioning protrusions. Accordingly, the bump foil structure 40 may be accurately mounted on the base plate 31.

The one or more positioning recesses or one or more positioning protrusions may be formed in the first ring 61 or the first connector 44 of the bump foil structure 40.

Figure 5:
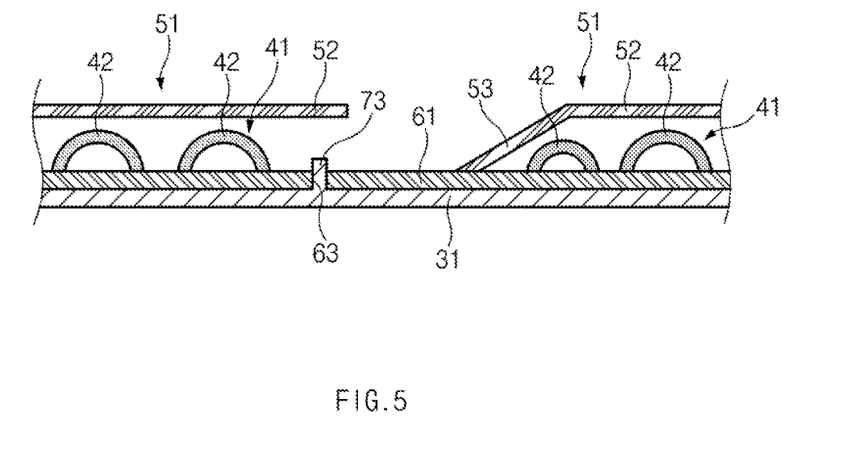
FIG. 5 is a sectional view taken along line A-A of FIG. 2.

According to an embodiment, as illustrated in FIGS. 3 and 5, the first ring 61 may have one or more first positioning recesses 63. The base plate 31 may correspondingly have one or more first positioning protrusions 73. Accordingly, as the first positioning protrusions 73 of the base plate 31 are accommodated in the first positioning recesses 63 of the first ring 61, the bump foil structure 40, including the first ring 61, may be positioned very accurately. Through this arrangement, the bump foils 41 of the bump foil structure 40 may be assembled in the base plate 31 very accurately and stably. Further, as illustrated in FIG. 3, two or more first positioning recesses 63 may be formed in the first ring 61 to be spaced apart from each other symmetrically or by a specific interval. Accordingly, the bump foil structure 40 may be positioned more accurately.

According to another example, the first positioning protrusions 73 may be formed in the first ring 61, and the first positioning recesses 63, in which the first positioning protrusions 73 are accommodated, may be formed in the base plate 31 correspondingly.

In this way, according to this embodiment of the present disclosure, the bump foil structure 40 may be formed as a single body through the first ring 61. As the first ring 61 or the first connector 44 is positioned in the base plate 31 accurately by a positioning structure, assembly reliability and assembly quality may be remarkably improved as compared with the related art.

Figure 4:
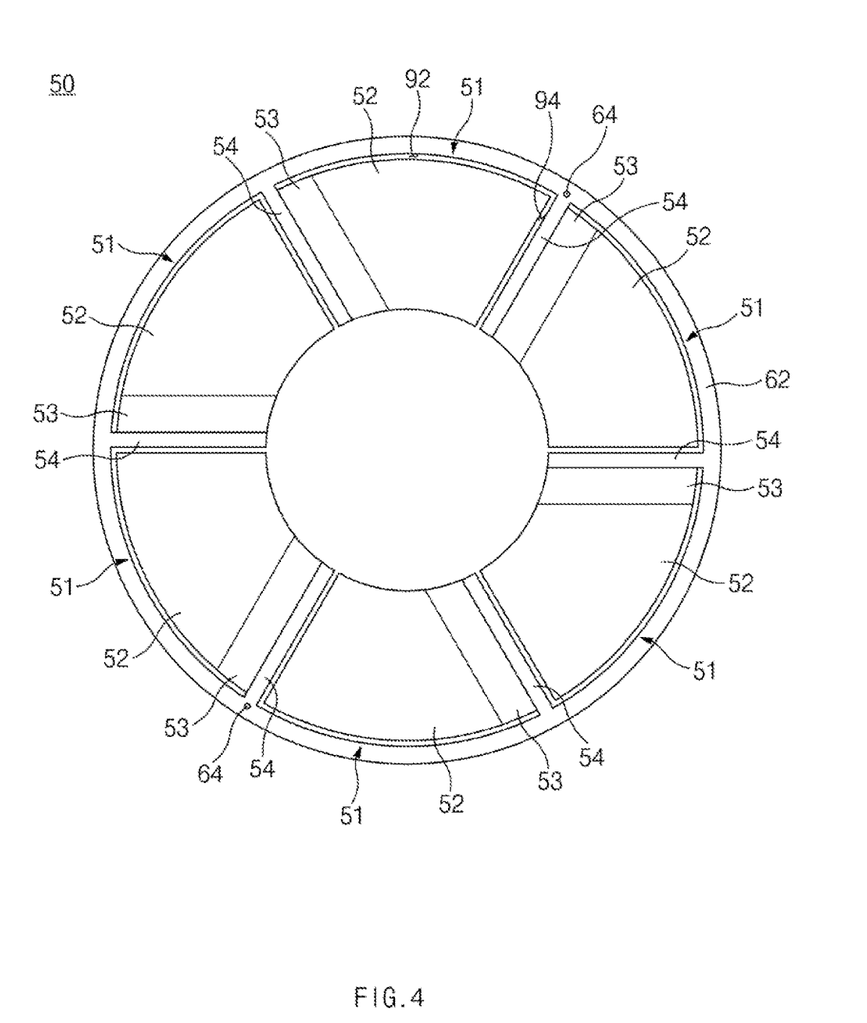
FIG. 4 is a plan view illustrating a top foil structure of the air foil thrust bearing according to the embodiment of FIG. 2.

As illustrated in FIG. 4, the top foil structure 50 may include two or more top foils 51. The top foil structure 50 may also include one or more second rings 62 connecting the two or more top foils 51 circumferentially.

The two or more top foils 51 may be circumferentially spaced apart from each other. FIG. 4 illustrates six top foils 51 circumferentially spaced apart from each other.

Each of the top foils 51 may have a sector shape, and may have a flat portion 52 having a flat upper surface and an inclined portion 53 connected to one side of the flat portion 52 to be inclined.

The top foil structure 50 may have two or more second connectors 54, each of which is formed on one side of the corresponding top foil 51 to be flat. At least one of the second connectors 54 of the top foil 51 may be attached to the base plate 31 through welding.

The two or more top foils 51 may be connected to the second ring 62 through the two or more second connectors 54. Accordingly, the two or more top foils 51 may be connected to each other along a circumferential direction of the second ring 62 as a single body. The two or more second connectors 54 may be disposed radially with respect to the second ring 62. The two or more top foils 51 may be spaced apart from each other through circumferential apertures 94.

According to an embodiment, as illustrated in FIGS. 2-6, the second ring 62 may be disposed at outer peripheries of the top foils 51. Accordingly, the outer peripheries of the top foils 51 may be connected to the second ring 62 through the second connector 54 as a single body. Here, an inner periphery of the second ring 62 and outer peripheries of the top foils 51 may be spaced apart from each other through radial apertures 92.

According to another example, the second ring 62 may be disposed at inner peripheries of the top foils 51. Accordingly, the inner peripheries of the top foils 51 may be connected to the second ring 62 through the second connectors 54 as a single body.

In this way, according to this embodiment of the present disclosure, as the two or more top foils 51 are integrated through the second ring 62, strength may be reinforced and only one second connector 54 may be attached to the base plate 31 through welding. Accordingly, the number of welding processes may be remarkably reduced as compared with the related art so that the assembly process may become simpler.

According to this embodiment of the present disclosure, the top foil structure 50 may have one or more positioning recesses or one or more positioning protrusions. Accordingly, the top foil structure 50 may be accurately mounted on the base plate 31.

The one or more positioning recesses or one or more positioning protrusions may be formed in the second ring 62 or the second connector 54 of the top foil structure 50.

Figure 6:
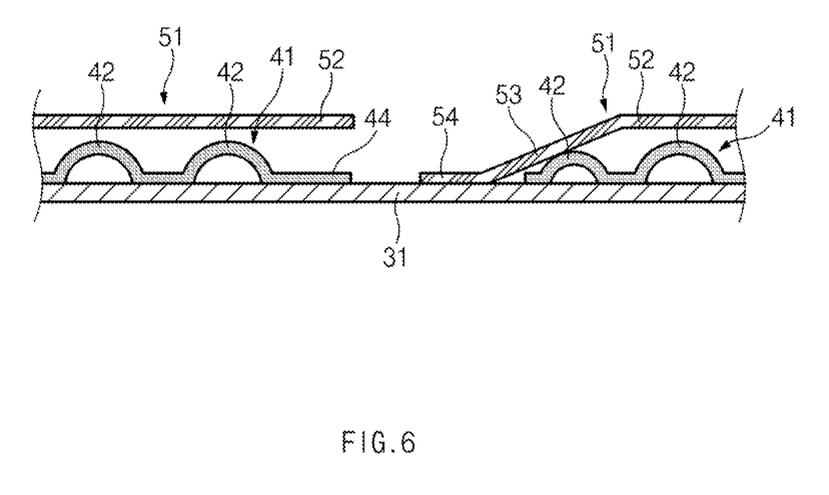
FIG. 6 is a sectional view taken along line B-B of FIG. 2.
Figure 7:
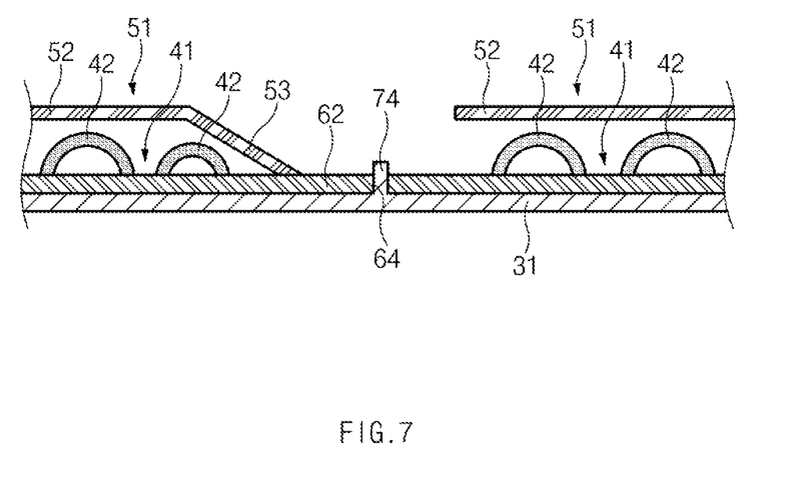
FIG. 7 is a sectional view taken along line C-C of FIG. 2.

According to an embodiment, as illustrated in FIGS. 4 and 6, the second ring 62 may have one or more second positioning recesses 64. The base plate 31 may correspondingly have one or more second positioning protrusions 74. Accordingly, as the second positioning protrusions 74 of the base plate 31 are accommodated in the second positioning recesses 64 of the second ring 62, the top foil structure 50 including second ring 62 may be positioned very accurately. Through this, the top foils 51 of the top foil structure 50 may be assembled in the base plate 31 very accurately and stably. Further, as illustrated in FIG. 6, two or more second positioning recesses 64 may be formed in the second ring 62 to be spaced apart from each other symmetrically or by a specific interval. Accordingly, the top foil structure 50 may be positioned more accurately.

According to another example, the second positioning protrusions 74 may be formed in the second ring 62. The second positioning recesses 64, in which the second positioning protrusions 74 are accommodated, may correspondingly be formed in the base plate 31.

According to an embodiment of the present disclosure, the first ring 61 and the second ring 62 of the air foil thrust bearing 30 may be disposed radially opposite to each other with respect to the bump foils 41 and the top foils 51. According to an embodiment, as illustrated in FIGS. 2-6, the first ring 61 may be located at inner peripheries of the bump foils 41, and the second ring 62 may be located at outer peripheries of the top foils 51. According to another example, the first ring 61 may be located at outer peripheries of the bump foils 41, and the second ring 62 may be located at inner peripheries of the top foils 51.

A process of assembling the air foil thrust bearing 30 of the present disclosure is described in detail below.

First, only one first connector 44 of the bump foil structure 40 is attached to the base plate 31 through welding.

Then, only one second connector 54 of the top foil structure 50 is attached to the base plate 31 through welding.

Then, as illustrated in FIG. 5, the top foils 51 of the top foil structure 50 are attached such that the top foils 51 of the top foil structure 50 are located above the bump foils 41 of the bump foil structure 40.

According to the present disclosure, as the plurality of bump foils 41 are connected to each other as a single body by the first ring 61 and the plurality of top foils 51 are connected to each other as a single body by the second ring 62, the plurality of bump foils 41 and the plurality of top foils 51 may be attached to the base plate 31 very simply and stably. Accordingly, the number of assembled components may be reduced, strength may be reinforced, and performance may be improved as well.

Further, the plurality of bump foils 41 and the plurality of top foils 51 may be attached to the base plate 31 very accurately and simply. As the first ring 61 and the second ring 62 may be positioned in the base plate 31 by the positioning recesses and the positioning protrusions, a manufacturing quality thereof may be stabilized, a manufacturing process thereof may be simplified, and manufacturing costs thereof may be reduced.

Meanwhile, although FIGS. 2-4 illustrate that six bump foils 41 and six top foils 51 are provided, the present disclosure is not limited thereto. However, two or more bump foils 41 and two or more top foils 51 may be variously provided.

Figure 8:
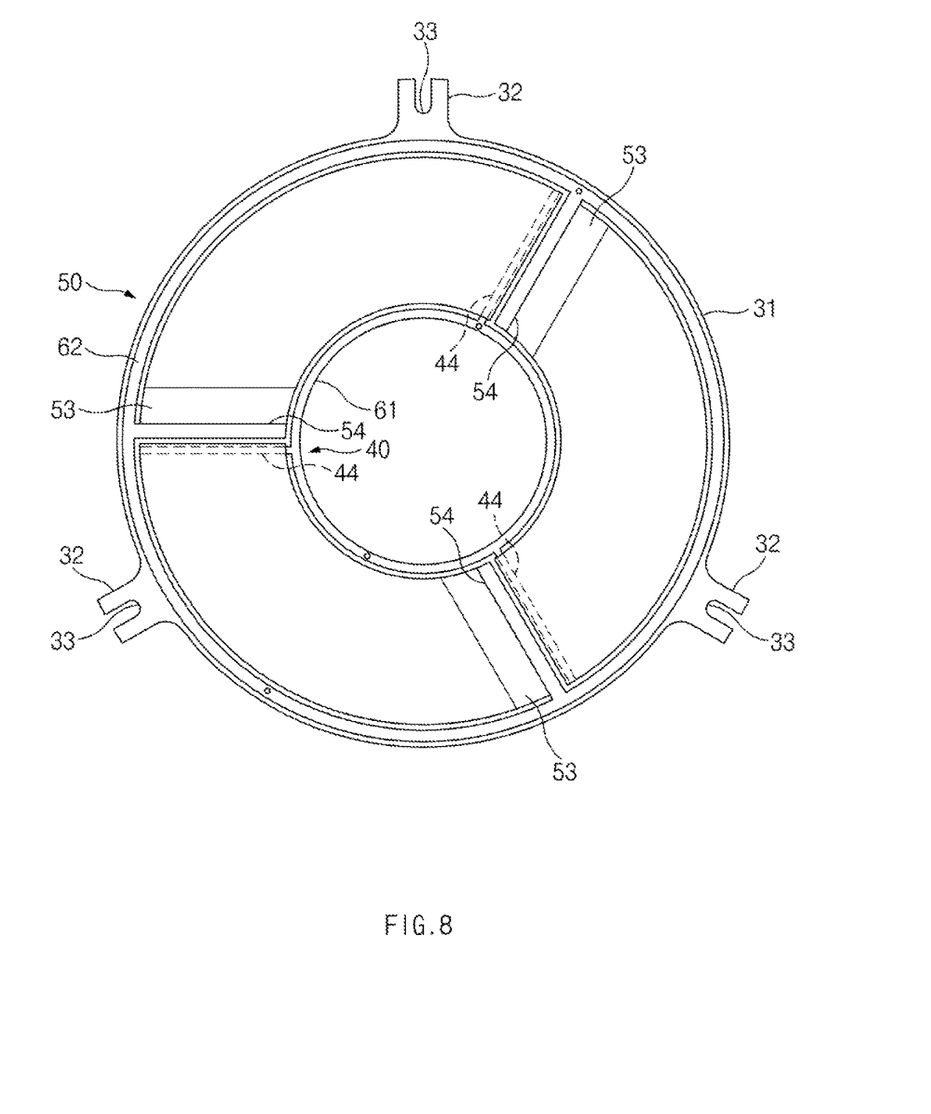
FIG. 8 is a plan view illustrating an air foil thrust bearing according to a second embodiment of the present disclosure.
Figure 9:
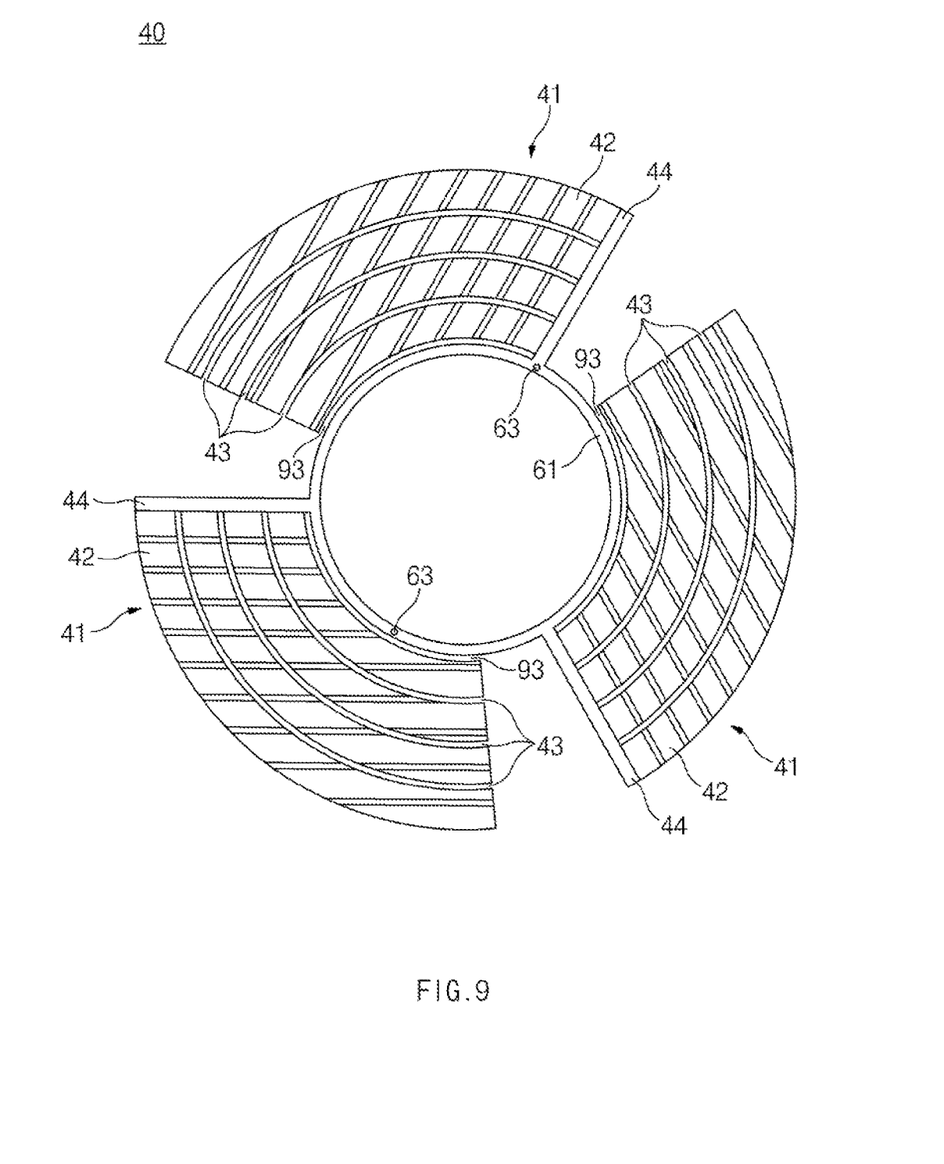
FIG. 9 is a plan view illustrating a bump foil structure of the air foil thrust bearing according to the second embodiment of FIG. 8.
Figure 10:
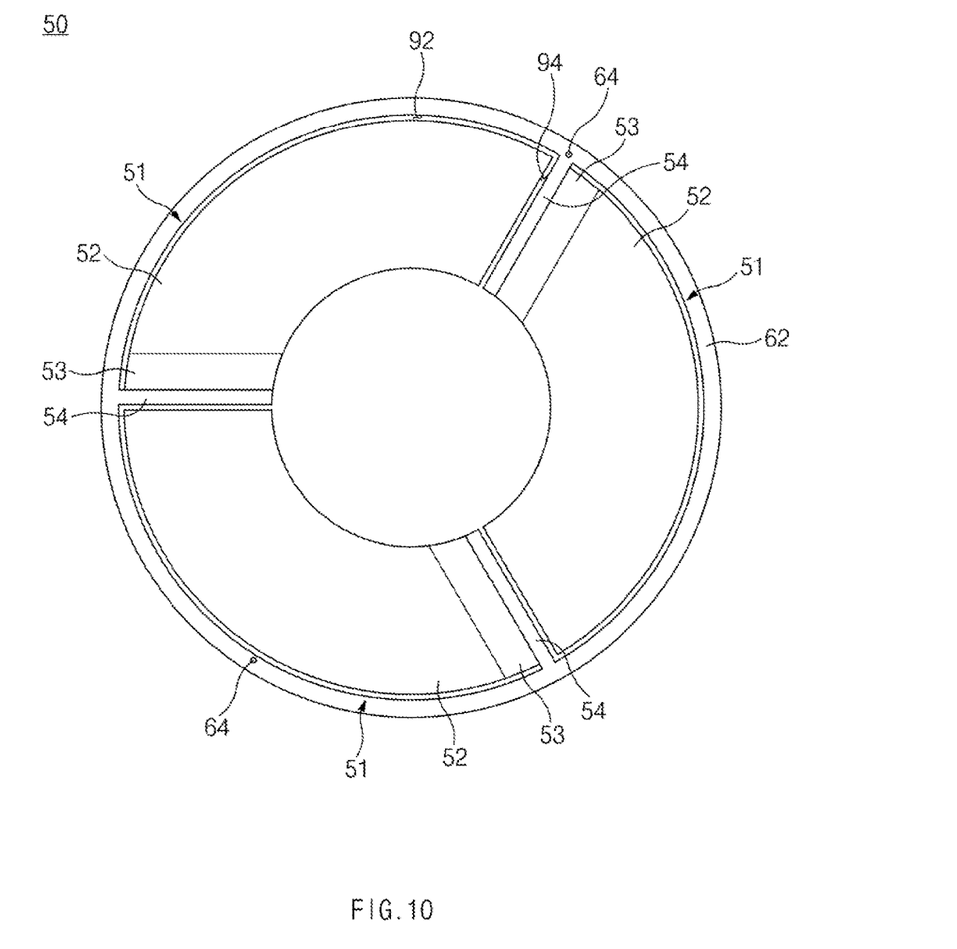
FIG. 10 is a plan view illustrating a top foil structure of the air foil thrust bearing according to the second embodiment of FIG. 8.

FIGS. 8-10 are views illustrating an air foil thrust bearing according to a second embodiment of the present disclosure. As illustrated in FIG. 9, three bump foils 41 may be provided in the bump foil structure 40, and the three bump foils 41 may be spaced apart from each other circumferentially. Correspondingly, as illustrated in FIG. 10, three top foils 51 may be provided in the top foil structure 50, and the three top foils 51 may be spaced apart from each other circumferentially.

The remaining configurations thereof may be the same as or similar to those of the preceding embodiments, and a detailed description thereof is thus omitted.

FIGS. 11-14 are views illustrating an air foil thrust bearing according to a third embodiment of the present disclosure.

Figure 12:
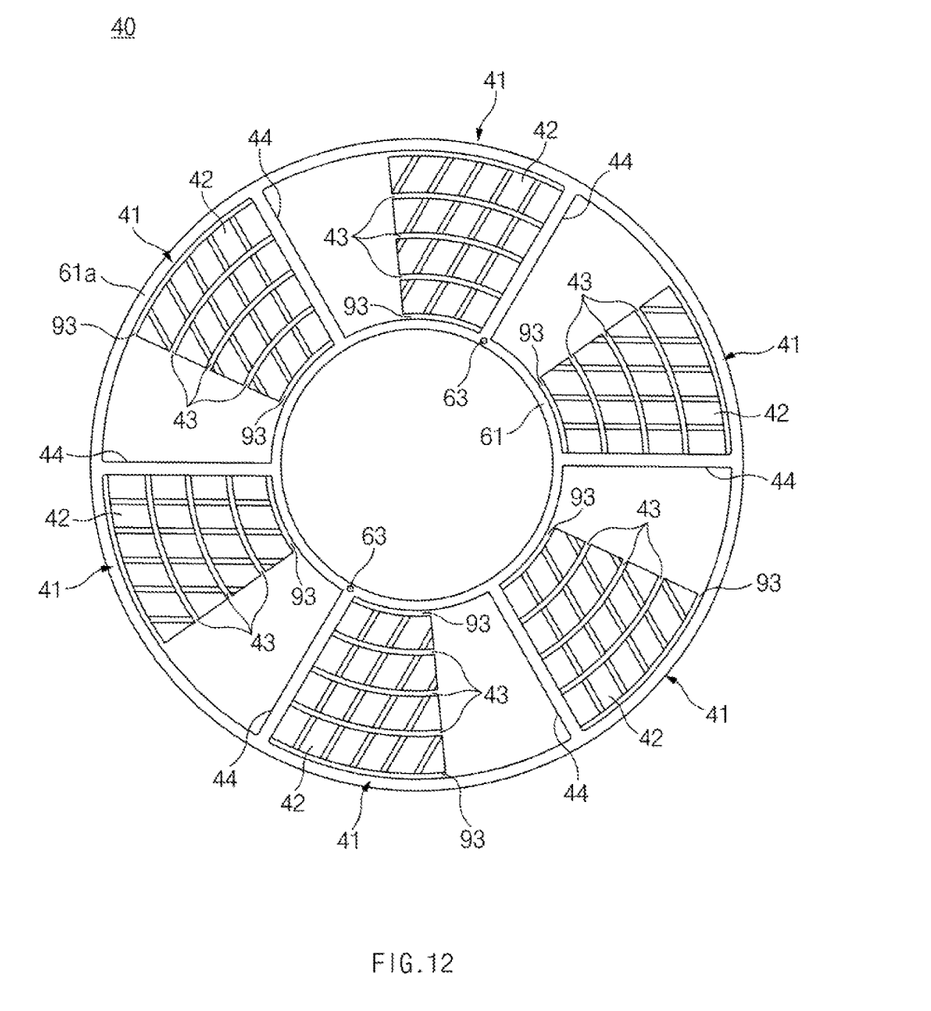
FIG. 12 is a plan view illustrating a bump foil structure of the air foil thrust bearing according to the third embodiment of FIG. 11.

As illustrated in FIG. 12, the bump foil structure 40 may include two or more bump foils 41. and the bump foil structure may also include two first rings 61 and 61a connecting the two or more bump foils 41 circumferentially.

Two first rings 61 and 61a may include an inner first ring 61 disposed at inner peripheries of the bump foils 41, and an outer first ring 61a disposed at outer peripheries of the bump foils 41. In this way, as the two first rings 61 and 61a individually connect the inner peripheries and the outer peripheries of the bump foils 41, strength may be further improved. Accordingly, the bump foil structure 40 may be mounted on the base plate 31 more firmly.

Figure 13:
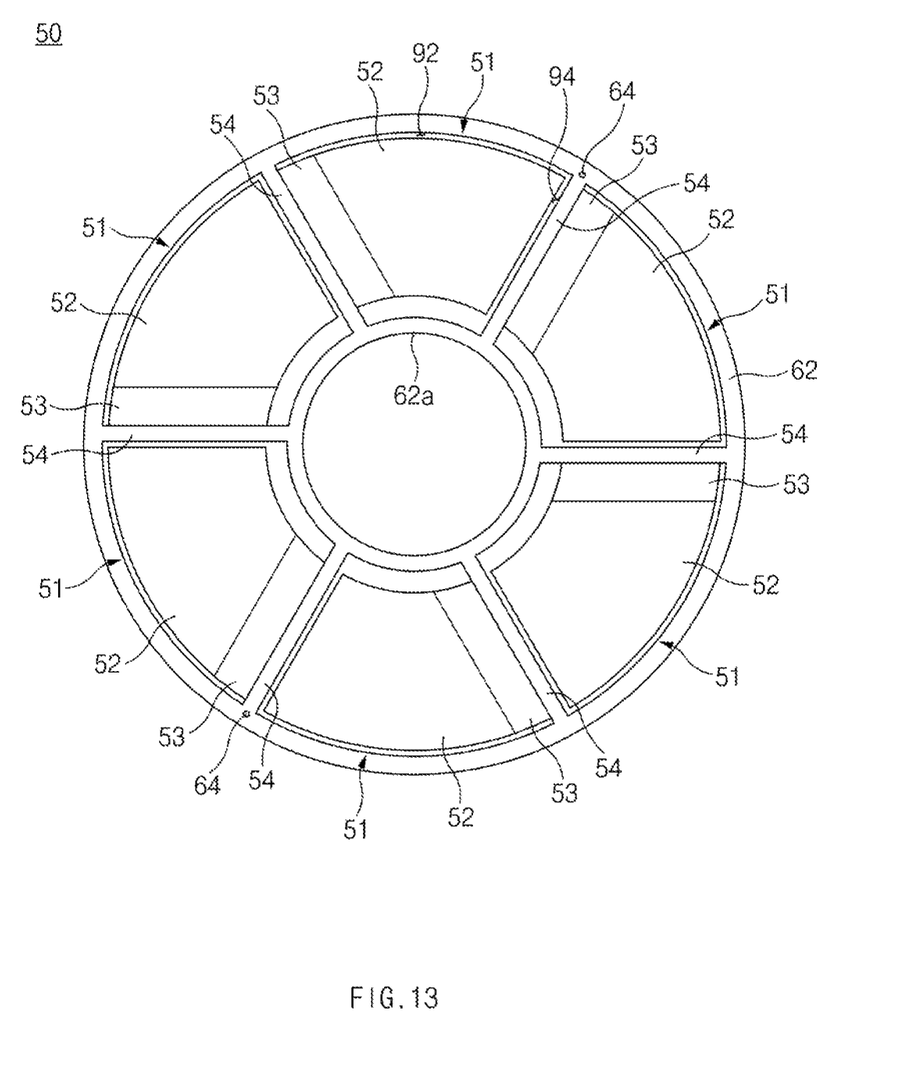
FIG. 13 is a plan view illustrating a top foil structure of the air foil thrust bearing according to the third embodiment of FIG. 11.

As illustrated in FIG. 13, the top foil structure 50 may include two or more top foils 51. The top foil structure may also include two second rings 62 and 62a connecting the two or more top foils 51 circumferentially.

Two second rings 62 and 62a may include an inner second ring 62a disposed at inner peripheries of the top foils 51, and an outer second ring 62 disposed at outer peripheries of the top foils 51. In this way, as the two second rings 62 and 62a individually connect the inner peripheries and the outer peripheries of the top foils 51, strength may be further improved. Accordingly, the top foil structure 50 may be mounted on the base plate 31 more firmly.

Figure 11:
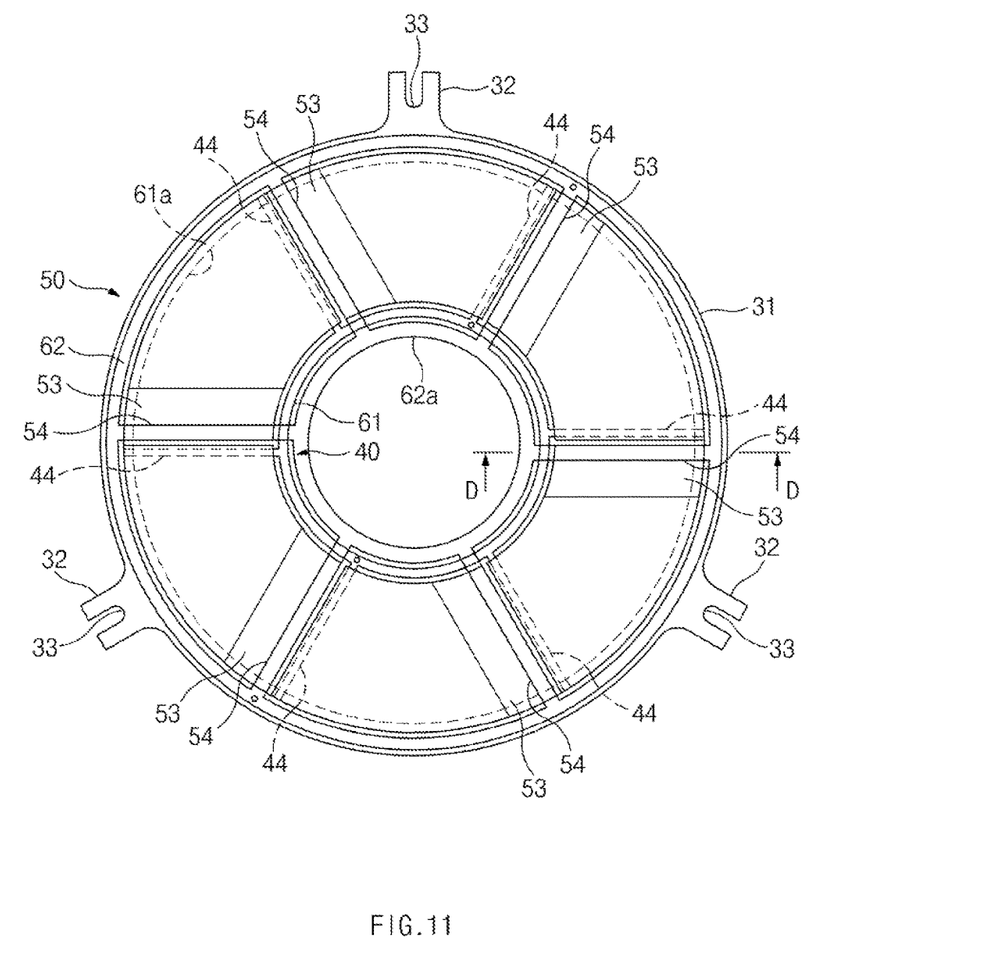
FIG. 11 is a plan view illustrating an air foil thrust bearing according to a third embodiment of the present disclosure.
Figure 14:
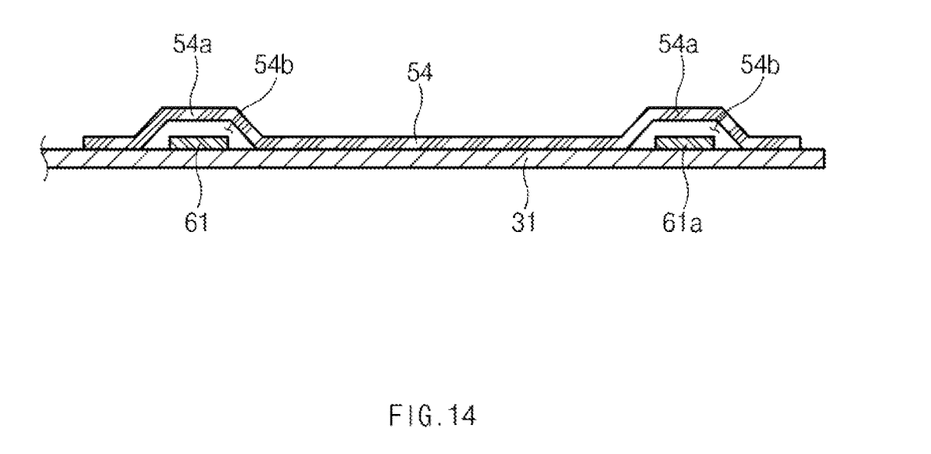
FIG. 14 is a sectional view taken along line D-D of FIG. 11.

According to an example, as illustrated in FIG. 11, the inner second ring 62a of the top foil structure 50 may be located on an inner side of the inner first ring 61 of the bump foil structure 40. The outer second ring 62 of the top foil structure 50 may be located on an outer side of the outer first ring 61a of the bump foil structure 40. Accordingly, because the second connector 54 of the top foil structure 50 and the first rings 61 and 61a of the bump foil structure 40 may interfere with each other, as illustrated in FIG. 14, the second connector 54 of the top foil structure 50 may have ribs 54a formed at locations corresponding to the first rings 61 and 61a. Each of the ribs 54a may have a through-groove 54b, through which the corresponding first rings 61 and 61a of the bump foil structure 40 pass. In this way, as the first rings 61 and 61a of the bump foil structure 40 pass through the through-grooves 54b of the second connector 54, the second connector 54 of the top foil structure 50 and the first rings 61 and 61a of the bump foil structure 40 may be prevented from interfering with each other.

According to another example, the inner first ring 61 of the bump foil structure 40 may be located on an inner side of the inner second ring 62a of the top foil structure 50, and the outer first ring 61a of the bump foil structure 40 may be located on an outer side of the outer second ring 62 of the top foil structure 50. In this case, because the second rings 62 and 62a of the top foil structure 50 and the first connector 44 of the bump foil structure 40 may interfere with each other, the ribs 54a having the through-grooves 54b may be formed in the first connector 44 of the bump foil structure 40. Accordingly, because the second rings 62 and 62a of the top foil structure 50 may pass through the through-grooves 54b of the first connector 44, the first rings 61 and 61a of the bump foil structure 40 and the second connector 54 of the top foil structure 50 may be prevented from interfering with each other.

The remaining configurations thereof may be the same as or similar to those of the preceding embodiments, and a detailed description thereof is thus omitted.

According to the present disclosure, the plurality of bump foils and the plurality of top foils may be attached to the base plate very simply and stably by connecting the plurality of bump foils as a single body by the first ring and connecting the plurality of top foils as a single body by the second ring. Through this, the number of assembled components may be reduced and performance may be improved by reinforcing strength.

Further, according to the present disclosure, the first ring and the second ring may be positioned in the base plate by the positioning structure, and the plurality of bump foils and the plurality of top foils may be attached to the base plate accurately and stably. Accordingly, a manufacturing quality thereof may be stabilized, a manufacturing process thereof may be simplified, and manufacturing costs thereof may be reduced.

Although detailed embodiments of the present disclosure have been described herein, the present disclosure is not limited to the embodiments disclosed in the specification and the accompanying drawings. The present disclosure may be variously modified by those having ordinary skill in the art without departing from the technical spirit of the present disclosure.

What is claimed is:

1. An air foil thrust bearing comprising:
a base plate;
a bump foil structure directly attached to the base plate, the bump foil structure having two or more bump foils and one or more first rings connecting the two or more bump foils; and
a top foil structure directly attached to the base plate, the top foil structure having two or more top foils and one or more second rings connecting the two or more top foils,
wherein the bump foil structure has one or more first positioning recesses in which one or more first positioning protrusions of the base plate are accommodated,
wherein one of the one or more second rings has one or more second positioning recesses in which one or more second positioning protrusions of the base plate are accommodated, and
wherein the one or more first positioning recesses are radially spaced apart from the one or more second positioning recesses.

2. The air foil thrust bearing of claim 1, wherein the bump foil structure has two or more connectors, each of which is formed on one side of the corresponding bump foil to be flat.

3. The air foil thrust bearing of claim 2, wherein the two or more bump foils are individually connected to the first ring through the two or more connectors.

4. The air foil thrust bearing of claim 1, wherein the one or more first rings are disposed at inner peripheries or outer peripheries of the bump foils.

5. The air foil thrust bearing of claim 1, wherein the one or more first rings include two first rings individually disposed at inner peripheries and outer peripheries of the bump foils, respectively.

6. The air foil thrust bearing of claim 1, wherein the top foil structure has two or more connectors, each of which is formed on one side of the corresponding top foil to be flat.

7. The air foil thrust bearing of claim 6, wherein the two or more top foils are individually connected to the second ring through the two or more connectors.

8. The air foil thrust bearing of claim 1, wherein the one or more second rings are disposed at inner peripheries or outer peripheries of the top foils.

9. The air foil thrust bearing of claim 1, wherein the one or more second rings include two second rings disposed at inner peripheries and outer peripheries of the top foils, respectively.

* * * * *